(12) United States Patent
West et al.

(10) Patent No.: US 7,893,586 B2
(45) Date of Patent: Feb. 22, 2011

(54) DC MOTOR WITH DUAL COMMUTATOR BAR SET AND SELECTABLE SERIES AND PARALLEL CONNECTED COILS

(75) Inventors: Joshua D. West, Towson, MD (US); Uday S. Deshpande, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 132 days.

(21) Appl. No.: 12/223,679

(22) PCT Filed: Feb. 20, 2007

(86) PCT No.: PCT/US2007/004541
§ 371 (c)(1),
(2), (4) Date: Aug. 6, 2008

(87) PCT Pub. No.: WO2007/098220
PCT Pub. Date: Aug. 30, 2007

(65) Prior Publication Data
US 2009/0033159 A1 Feb. 5, 2009

Related U.S. Application Data

(60) Provisional application No. 60/775,407, filed on Feb. 20, 2006.

(51) Int. Cl.
*H02K 13/04* (2006.01)
(52) U.S. Cl. .................................. 310/140; 310/50
(58) Field of Classification Search .............. 310/50, 310/134–136, 140–149
See application file for complete search history.

(56) References Cited

U.S. PATENT DOCUMENTS

| | | | |
|---|---|---|---|
| 4,271,380 A * | 6/1981 | Bradler et al. | 318/245 |
| 4,292,559 A | 9/1981 | Auinger et al. | |
| 4,315,176 A * | 2/1982 | Sendo et al. | 310/83 |
| 4,408,150 A | 10/1983 | Holston et al. | |
| 4,463,841 A * | 8/1984 | Kelley | 192/18 A |
| 4,910,790 A * | 3/1990 | Kershaw | 388/836 |
| 5,434,463 A * | 7/1995 | Horski | 310/248 |
| 5,614,775 A * | 3/1997 | Horski et al. | 310/68 R |
| 6,982,512 B2 * | 1/2006 | Schuster et al. | 310/148 |
| 7,105,969 B2 * | 9/2006 | Simofi-Ilyes et al. | 310/136 |
| 2003/0127932 A1 | 7/2003 | Ishida et al. | |
| 2004/0124727 A1 * | 7/2004 | Lau | 310/83 |
| 2004/0212263 A1 * | 10/2004 | Kitoh et al. | 310/99 |
| 2007/0159013 A1 * | 7/2007 | Maruyama et al. | 310/51 |

* cited by examiner

*Primary Examiner*—Thanh Lam
(74) *Attorney, Agent, or Firm*—Harness, Dickey & Pierce, P.L.C.

(57) ABSTRACT

A permanent magnet, DC motor especially well adapted for use in power tools, and particularly hand-held, battery powered power tools. The motor includes two sets of armature coils, with each set of coils being coupled to separate sets of commutator bars on an armature. Separate pairs of brushes are used to interface with the two sets of commutator bars. A switching subsystem is controlled either manually by a user engageable switch or automatically by a controller, to connect the two sets of coils in either series or parallel configurations. The series configuration provides a greater efficiency, but with a lower power output than the parallel connection. The parallel connection provides a greater maximum power output from the motor. Thus, the operating characteristics of the tool can be tailored to better meet the needs of a work task, and in a manner than makes most efficient use of available battery power.

20 Claims, 14 Drawing Sheets

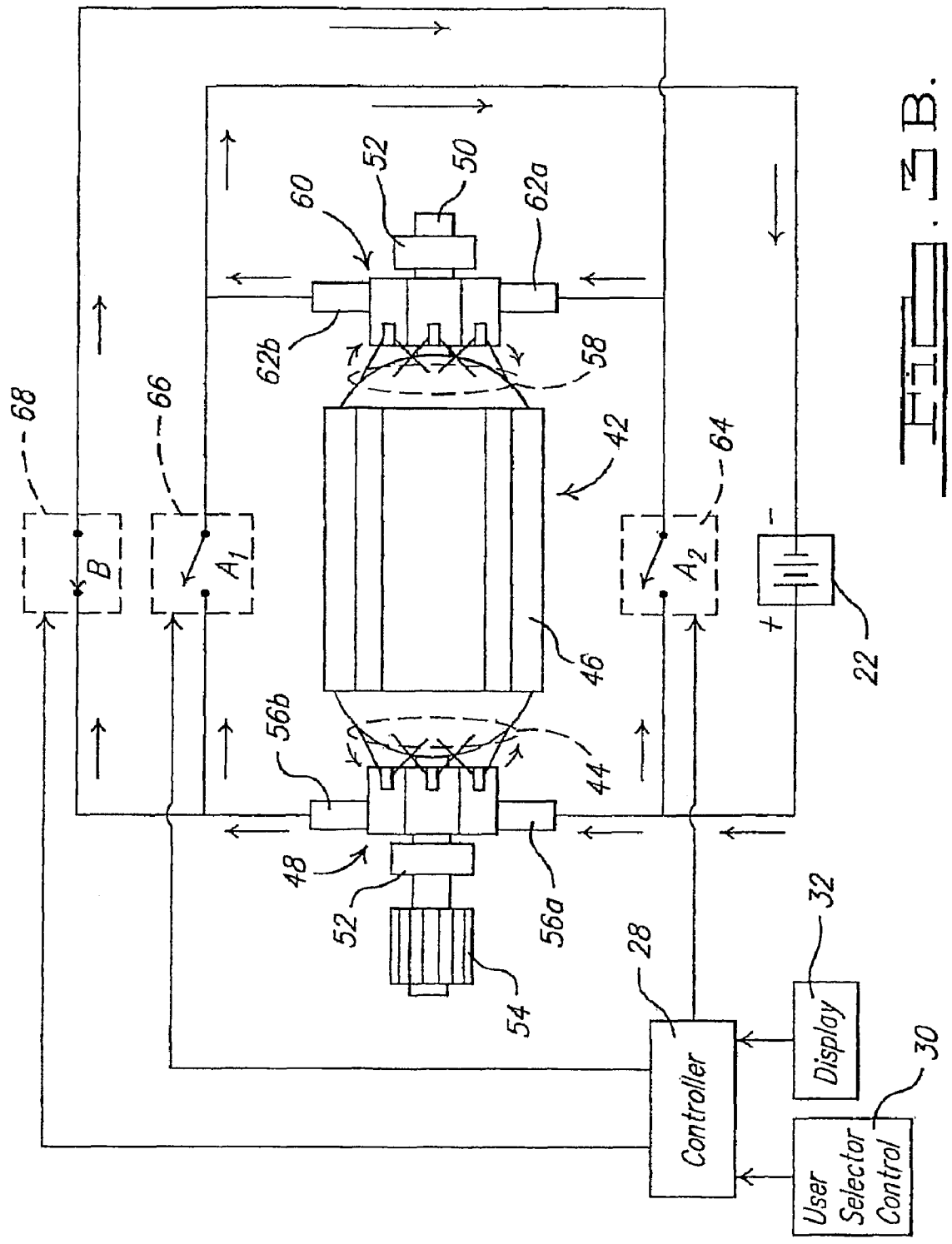

DC MOTOR WITH DUAL COMMUTATOR BAR SET AND SELECTABLE SERIES AND PARALLEL CONNECTED COILS

CROSS REFERENCE TO RELATED APPLICATIONS

The present application claims priority from U.S. provisional application No. 60/775,407, filed 20 Feb. 2006, entitled "Electronically Commutated Motor and Control System", the disclosure of which is hereby incorporated by reference into the present application.

FIELD

The present disclosure relates to DC electric motors, and more particularly to a DC motor having an armature with a pair of commutator bar sets and an armature lamination stack with two sets of coils wound thereon, and a switching system for enabling the two sets of coils to be controllably connected in series or parallel to provide a plurality of distinct operating modes for the motor.

BACKGROUND

Permanent Magnet DC motors are used in a wide variety of applications, and particularly with power tools such as drills, saws, sanders, etc. Such motors are used with cordless power tools that are powered from a rechargeable DC battery. With cordless power tools, a wide variety of tasks often need to be performed that require different motor performance characteristics to best perform the work task. For example, when drilling a hole with a cordless drill in a soft piece of wood, the amount of torque required, and thus the power output required from the motor, may be only a small fraction of what would be needed to drill through a piece of hardwood or pressure treated lumber. However, designing the motor for high power applications is inefficient, from a power standpoint, if the same drill will frequently be used with tasks that involve only light duty drilling, where only low torque is needed for the work task.

In permanent magnet DC motors, the operating characteristics of the motor can be significantly changed by varying the wire size and the number of winding turns of each of the coils that are wound onto the armature lamination stack. For a permanent magnet DC given motor, doubling the number of winding turns making up each coil cuts the no-load speed of the motor roughly in half, and the stall torque of the motor increases significantly. The actual stall torque will be greatly influenced by the source impedance. For example, a typical battery/power tool combination may result in a 50% increase in stall torque for the motor. Also, motor efficiency will increase, but at the same time the maximum power output of the motor will decrease. Thus, simply doubling the number of winding turns for the coils, while providing significantly increased stall torque and greater efficiency at low power, will alter the operating characteristics of the motor in a way that will make the motor less suitable for work tasks requiring a greater power output. However, designing a permanent magnet motor to provide a higher constant power output will result in the motor drawing additional battery current that may not be needed for many drilling tasks (i.e., light duty drilling tasks). For a given motor, this will reduce the run time of the battery powering the tool, compared to the run time that could be achieved with a motor designed for a lower maximum power output.

Accordingly, it would be beneficial to provide a DC motor having a plurality of distinctly different operating modes that provide varying degrees of motor speed, torque and power output, to better match the needs of specific work tasks. For example, it would be highly beneficial if a motor and associated control system was provided that could automatically sense when additional motor power is required when performing a given task, and the motor automatically switched to a specific operating mode to either increase or decrease the torque and/or operating speed of the motor. Alternatively, it would be desirable if the different operating modes of the motor could be selected by a user via a control on the power tool. This would give the user control over implementing the various available operating modes. Optimizing the motor performance for a given work task would also help to make most efficient use of the available battery power, in view of the work task(s) being performed. This in turn could serve to significantly extend the run time of the battery, for a given DC motor, on a given charge.

SUMMARY

The present disclosure is related to an electric motor that is especially well adapted for use with a wide variety of power tools, but is not necessarily restricted to applications involving power tools. In one embodiment, the motor comprises a DC motor having a stator and an armature supported for rotational movement within the stator. The armature includes a lamination stack and an armature shaft extending coaxially through the lamination stack. The armature shaft includes two sets of commutator bars supported on the armature shaft, two sets of coils wound on the lamination stack, and two pairs of brushes. A first pair of the brushes is associated with one of the sets of commutator bars and a second pair of the brushes is associated with a second one of the commutator bar sets. A switching system interconnects the two pairs of brushes so that the two coil sets are connected to form either a series circuit or a parallel circuit. When connected in a series configuration, the motor has a no-load operating speed roughly about one-half of what its no-load operating speed is when the two coil sets are coupled in parallel, with a significantly increased stall torque and higher efficiency at a lower power output. When the two coil sets are connected in the parallel configuration, the motor provides a higher maximum power output than the series configuration and a no-load speed that is about double that of the series configuration. However, the motor has a lower efficiency when the coil sets are configured in the parallel configuration.

Thus, controlling the connection of the two sets of armature coils between series and parallel configurations provides the motor with two distinct operating modes having different operating characteristics. This enables a "maximum power" mode to be implemented, where the motor is configured with its two coil sets in a parallel configuration. This provides the motor with a higher no-load speed and a maximum power output, for those tasks requiring a greater power output from the motor. If the motor is used in a drill, such heady duty tasks might involve driving screws into a hardwood or drilling into moist pressure treated lumber. Use of the same drill can be optimized for light duty tasks by using the series configuration for the coils, which provides a greater degree of motor efficiency with a lesser power output, making the motor better suited for light duty drilling tasks. Such light duty drilling tasks might include drilling holes or driving screws in a soft wood such as pine.

In one embodiment, a controller is used in connection with motor speed sensing and motor current sensing to automatically switch the coil sets between the series and parallel configurations. The controller selects between the series and parallel winding configurations to configure the motor to best match the operating characteristics the motor to the needs of the present work task. In another embodiment, the power tool includes a control that the user uses to select either a maximum power mode or a maximum efficiency mode. In still another embodiment, an optional LED display informs the user which mode the tool is operating in.

Further areas of applicability of the present disclosure will become apparent from the detailed description provided hereinafter. It should be understood that the detailed description and specific examples, while indicating various preferred embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 3A and 3B are simplified block diagrams illustrating the armature of the motor of FIG. 2, its two sets of commutator bars, two sets of coils, two pairs of commutator bars, the electrical switches used to selectively configure the two coil sets in either series or parallel configurations, as well as various other components used to sense the operating conditions the motor experiences and to select between the series (FIG. 3A) and parallel (FIG. 3B) coil connection configurations;

FIGS. 25-28 are top views of the power tool of FIG. 1 illustrating the selector switch and display system for displaying tool operating modes and battery charge level.

DETAILED DESCRIPTION

The following description of various preferred embodiment(s) is merely exemplary in nature and is in no way intended to limit the disclosure, its application, or uses.

Figure 1:
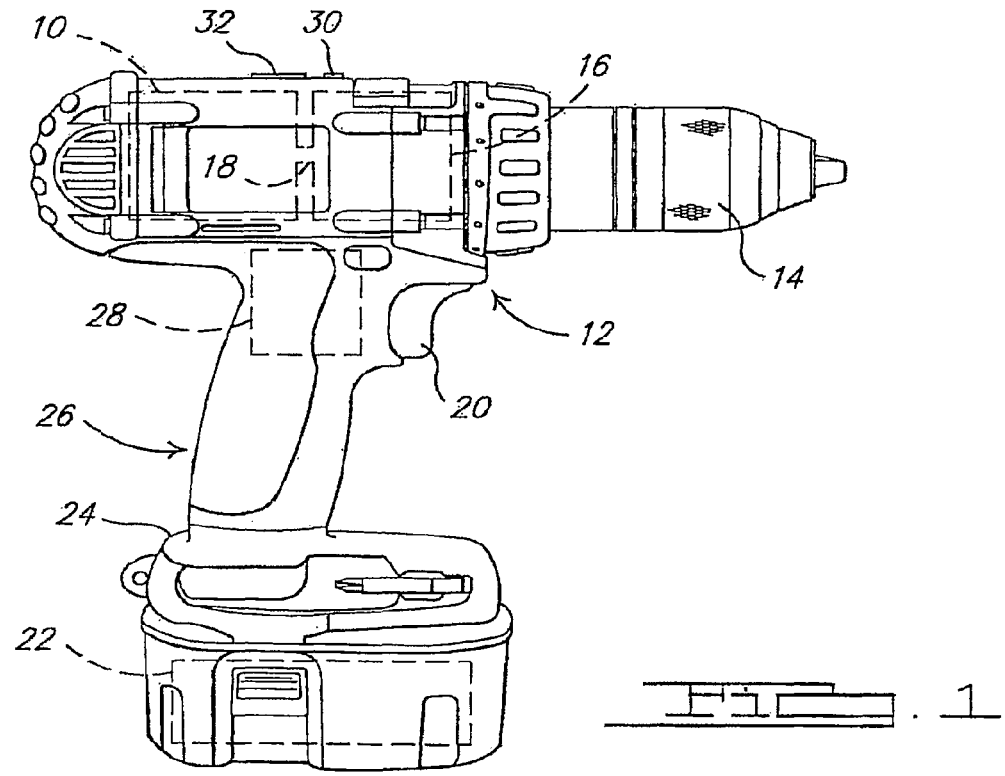
FIG. 1 is a side view of a exemplary power tool, in this example a cordless drill, with a permanent magnet DC motor in accordance with a preferred embodiment of the present disclosure indicated in dashed lines.

Referring to FIG. 1, a power tool in the form of a drill 12 incorporating a motor system 10 in accordance with a preferred embodiment of the present disclosure is shown. It will be appreciated immediately that while the power tool is illustrated as a hand held drill 12, that the motor system 10 can be implemented in a wide variety of other power tools such as saws, sanders, routers, drill presses, and virtually any other form of DC powered tool or device. The motor system 10, however, is expected to find particular utility with hand held cordless power tools.

Referring further to FIG. 1, the exemplary drill 12 typically includes a chuck 14 coupled to an output of a gear reduction unit 16. An input of the gear reduction unit 16 is coupled to an output shaft 18 of a motor 10a. A trigger 20 is used to turn on and off the motor 10a and may also be used to control the speed of the motor depending on the degree of engagement of the trigger. A rechargeable battery 22 is held removably within, or attached removably to, a handle portion 24 of a housing 26 of the drill 12. A controller 28 is also disposed in the handle portion 24, but could instead be located at other locations within the drill 12. The controller 28 is in communication with the trigger 20 and the motor 10a. The controller 28 is used to control the motor 10a and will be described in greater detail momentarily.

Also in communication with the controller 28 is a user engageable selector switch 30. The selector switch 30 may be a linear slide switch, a multi-position rotary switch, or even a plurality of pushbutton switches. The selector switch 30 allows the user to select from one of a plurality of operating modes for the motor 10a that tailor the operating characteristics of the motor 10a to better handle a specific task. For example, as will be described in greater detail in the following paragraphs, the user may use the selector switch 30 to select a high speed, low power output if a work task involves driving screws into a soft wood. The user may select a higher power output mode for the motor 10a if the work task involves drilling into a hardwood, into moist pressure treated lumber, or into other materials where a greater amount of motor power is required. A display 32 may be incorporated for displaying the various operating modes of the motor 10a. The display 32 may comprise an LCD, LED, or any other suitable form of display device that has low power draw.

Figure 2:
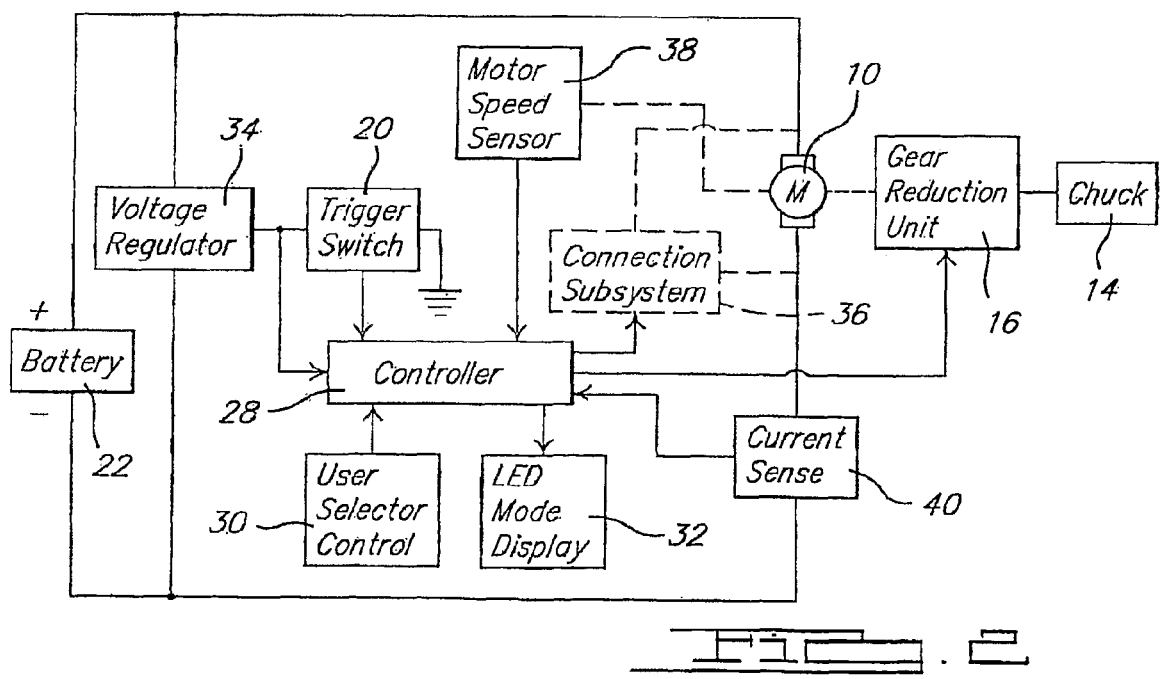
FIG. 2 is simplified schematic block diagram of the internal components of the power tool of FIG. 1.

Referring to FIG. 2, a highly simplified block diagram of the internal components of the drill 12 is shown. A conventional voltage regulator 34 is used to provide a regulated DC voltage to the controller 28 and other electronic components used in the drill 12. The controller 28 may be an 8-bit, 16-bit or more powerful controller, such as a digital signal processor (DSP). In one embodiment, the system for electrically coupling the armature coils of the motor 10a in series and parallel configurations comprises a MOSFET connection subsystem 36. A motor speed sensor 38 may be used to sense the speed of the motor 10a and to apply a control signal to the motor 10a indicative of the motor speed. A current sensing circuit 40 may be used to sense current flow through the motor 10a and to apply a control signal to the controller 28 in accordance with the sensed current flow through the armature coils of the motor 10a. Components 28, 30, 32, 34, 38 and 40 a "control" section of the drill 12. The motor system 10 can be viewed as including the motor 10a, the connection subsystem 36, the speed sensor 38, the current sensing circuit 40, the controller 28, the user selector control 30 and the trigger switch 20.

Figure 3A:
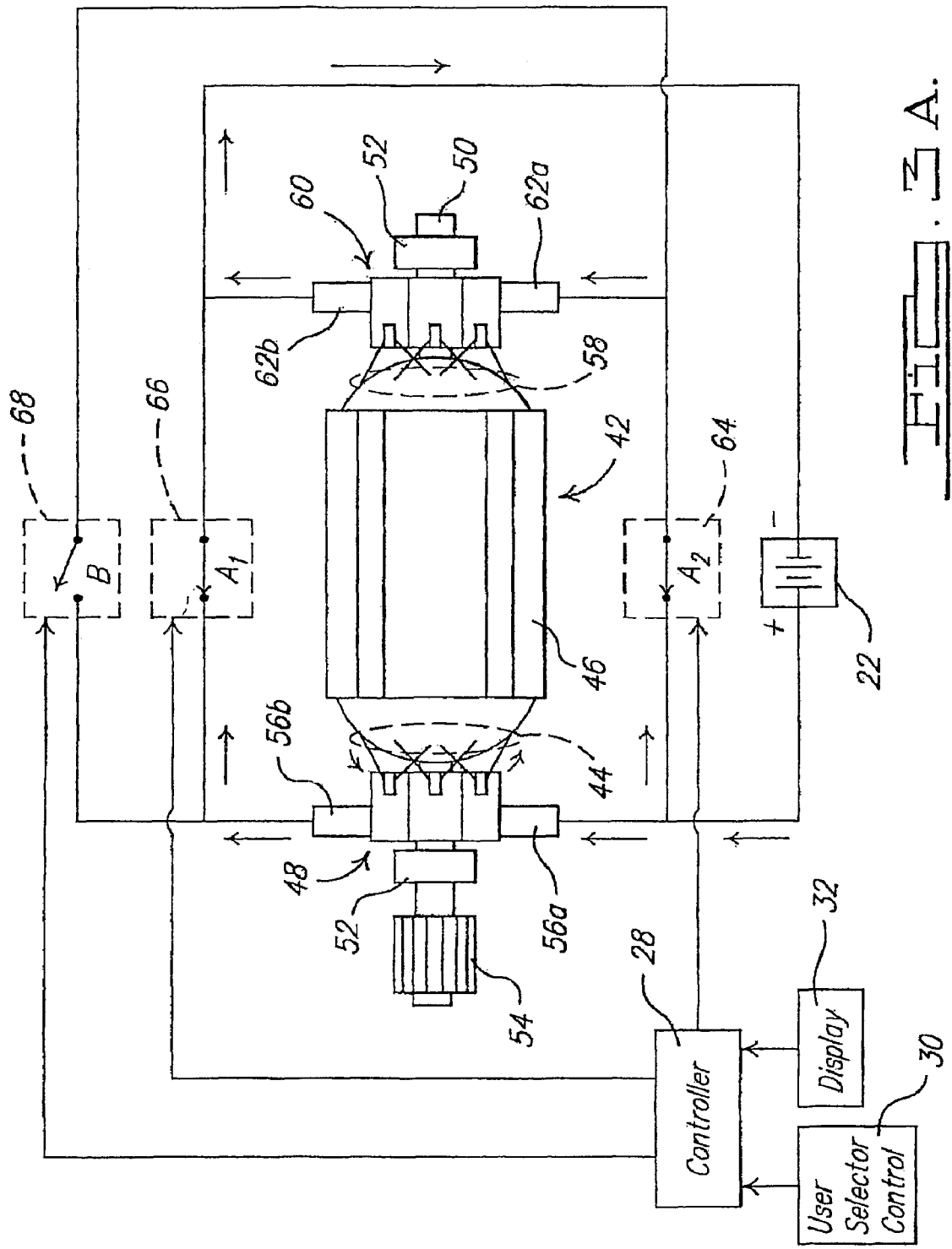

Referring to FIG. 3A, an armature 42 of the motor 10a is shown. As will be described more fully in the following paragraphs, the motor 10a includes a first set of armature coils, represented in highly schematic form by reference numeral 44, wound on a lamination stack 46 of the armature 42. The first set of coils 44 are coupled to a first set of commutator bars 48. The first set of commutator bars 48 are supported on an armature shaft 50. The armature shaft 50 extends through a coaxial center of the lamination stack 46 and includes a pair of bearings 52 adjacent opposite ends for supporting the armature shaft 50 for rotational movement within a housing of the drill 12. A pinion 54 is used to engage the gear reduction unit 16. A first pair of brushes 56a,56b are positioned to contact the first set of commutator bars 48.

The armature 42 also includes a second set of armature coils 58 wound in the slots of the lamination stack 46. The second set of coils 58 are coupled to a second set of commutator bars 60 mounted on the armature shaft 50. A second pair of brushes 62a,62b are positioned in contact with the second set of commutator bars 60.

The two pairs of brushes 56a,56b and 62a,62b are connected to the terminals of the battery 22 by switches 64, 66 and 68. Switches 64, 66 and 68 collectively represent the switch connection subsystem 36 in FIG. 2. Switches 64, 66 and 68 enable the brushes to be connected so that the two sets of armature coils 44,58 are connected either in series or in parallel. Connecting the armature coils 44,58 in series provides a first operating mode in which the motor 10a has a lower maximum power output, but a lower no-load speed, but a greater efficiency. Connecting the armature coils 44,58 in parallel provides a second operating mode. In the second operating mode the motor 10a has a higher no-load speed and higher maximum power output than that provided by the series connected configuration, but at the cost of a lesser degree of motor efficiency when the motor is operating at a lower power output. Thus, by controlling the connections of the two armature coil sets 44,58, significantly different operating characteristics can be provided by a single motor. This enhances the utility of the motor 10a by allowing its operational characteristics to be better tailored to the specific work task at hand (i.e., one requiring either higher motor power or lesser motor power). By selecting the first operating mode for those tasks that require a lesser degree of motor power, the current drawn by the motor 10a is reduced, thus extending the run time of the drill 12 on a given charge as compared to the run time that would be achieved if the drill was operated continuously in the second operating mode. However, the second operating mode is readily available for those work tasks that require a greater degree of motor output power.

FIG. 3A illustrates the two sets of brushes 56a,56b and 62a,62b connected via the switches 64, 66 and 68 so that the two coil sets 44,58 are coupled in series. In this mode switches 64 and 66 are open, while switch 68 is closed. Arrows indicate the direction of current flow through the brushes 56a,56b,62a,62b and switches 64,66,68 when the motor 10a is in its first operating mode, with both coil sets 44,58 connected in series. A complete series path is formed between brush 56a, first coil set 44, brush 56b, switch 68, brush 62a, second coil set 58, and brush 62b.

FIG. 3B indicates the direction of current flow through the same components but with the switches 62,64,66 configured to couple the brush pairs 56a,56b in parallel. In this mode switches 64 and 66 are closed while switch 68 is open. Current flows from the positive terminal of the battery 22 simultaneously to brushes 56a and 62a, simultaneously through both coil sets 44 and 58 and back to the negative terminal of the battery 22. The current flowing through the first coil set 44 flows through switch 66 on its way back to the negative terminal of the battery 22.

The switches 64, 66 and 68 may comprise MOSFET switches that are all located on a common, independent circuit board assembly, or alternatively they may be located on a printed circuit assembly with the controller 28. Any other electrically controlled switch besides a MOSFET may be employed, provided the switch is able to handle the maximum motor current that will be drawn by the motor 10a when operating in its maximum power mode.

Figure 4:
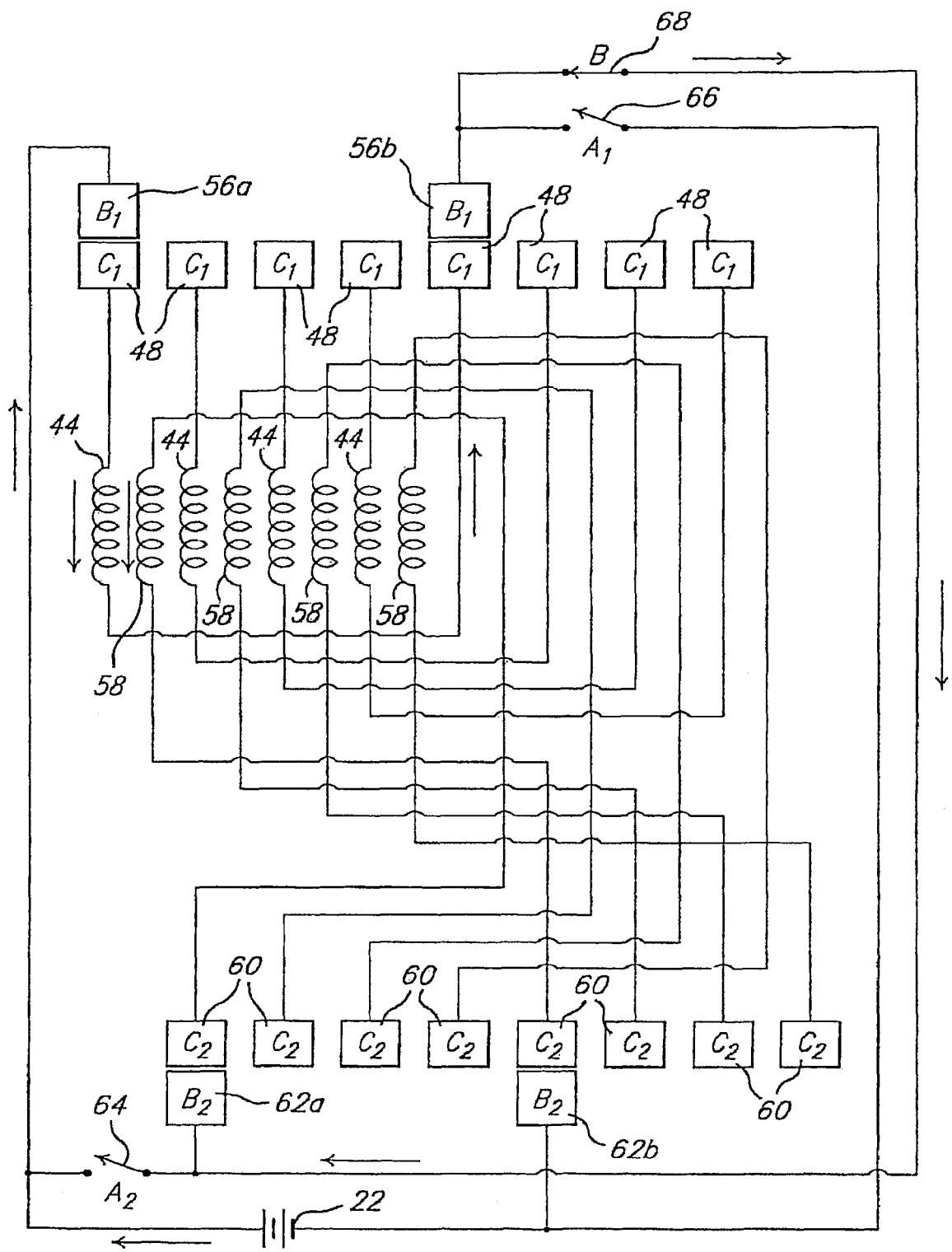
FIG. 4 is a simplified electrical schematic diagram illustrating the connections of the two coil sets when the coil sets are connected in series.
Figure 5:
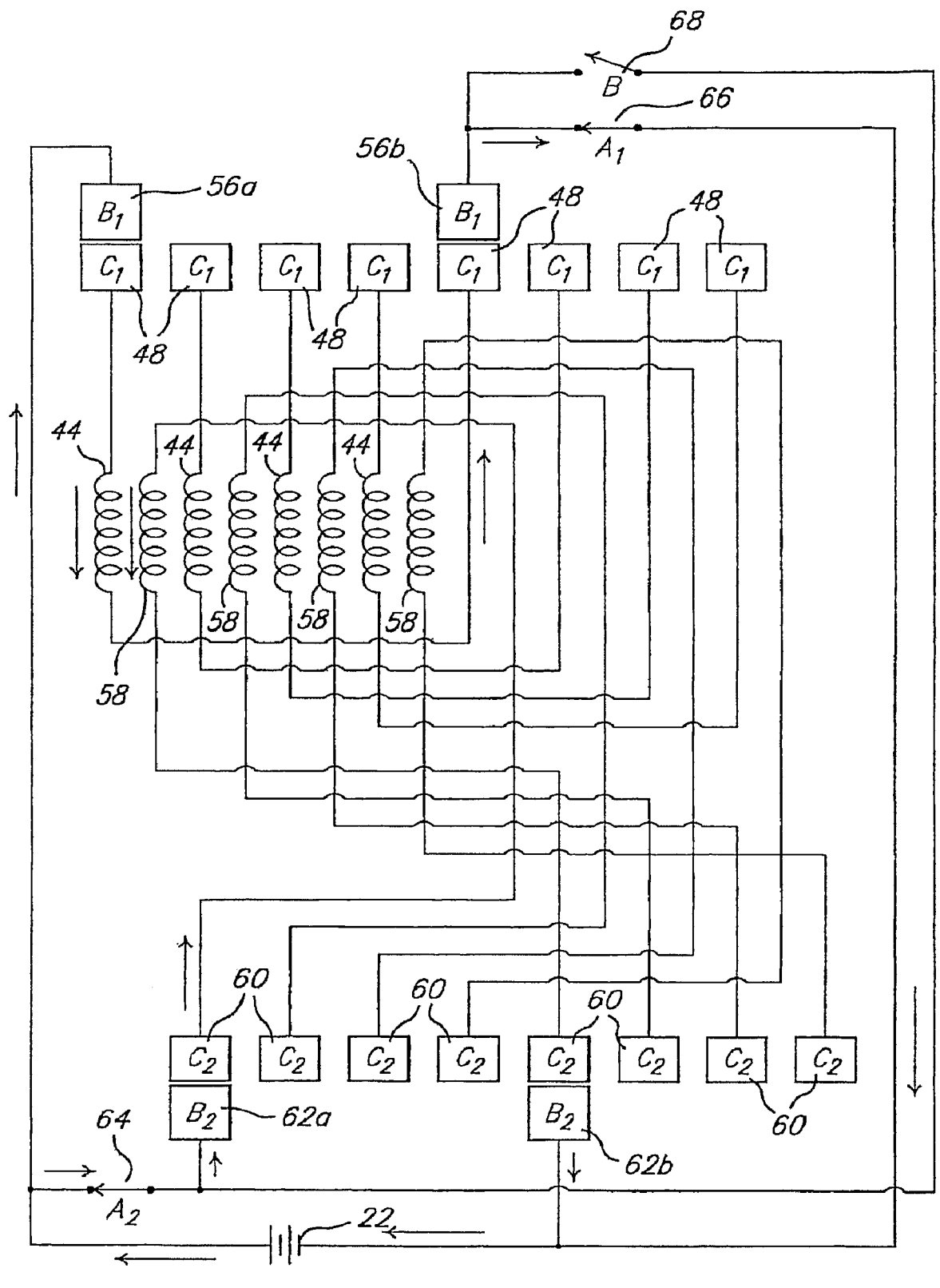
FIG. 5 shows the two coil sets of FIG. 4 connected in a parallel configuration.

Referring to FIGS. 4 and 5, simplified electrical schematic diagrams of the coil sets 44 and 58 are illustrated to further show an example of the interconnections of the two coil sets 44 and 58 to their respective commutator bars sets 48 and 60. In this example, the armature 42 is wound with a first set of ten coils making up the first coil set 44, and a separate set of ten coils making up the second coil set 58.

Comparisons of Motor Operating Characteristics

Providing a motor that is capable of the above-described operating modes requires considering its fundamental operating characteristics. For example, a motor designed for higher power becomes less efficient at low torque and high speed applications, such as when driving small screws or drilling small holes in soft wood. The main reason for this is that a motor designed for maximum power will have a low torque-per-amp ratio as a result of having a high no-load speed and a low number of coil turns. Essentially, when the two coil sets 44,58 are connected in series, the motor 10*a* will produce half of the power and will operate at half of the no load speed, as compared to what would be obtained with the coil sets 44,58 connected in parallel. However, connecting the coil sets 44,58 in series will essentially produce twice the torque-per-amp ratio as a parallel coupling of the winding sets 44,58. Accordingly, with the coil sets 44,58 connected in series, the motor 10*a* will only draw about half the current for the same low torque, high speed applications. Thus, connecting the coil sets 44,58 in series will improve the run time of the battery 22, powering a given motor, on a given charge.

Figure 6:
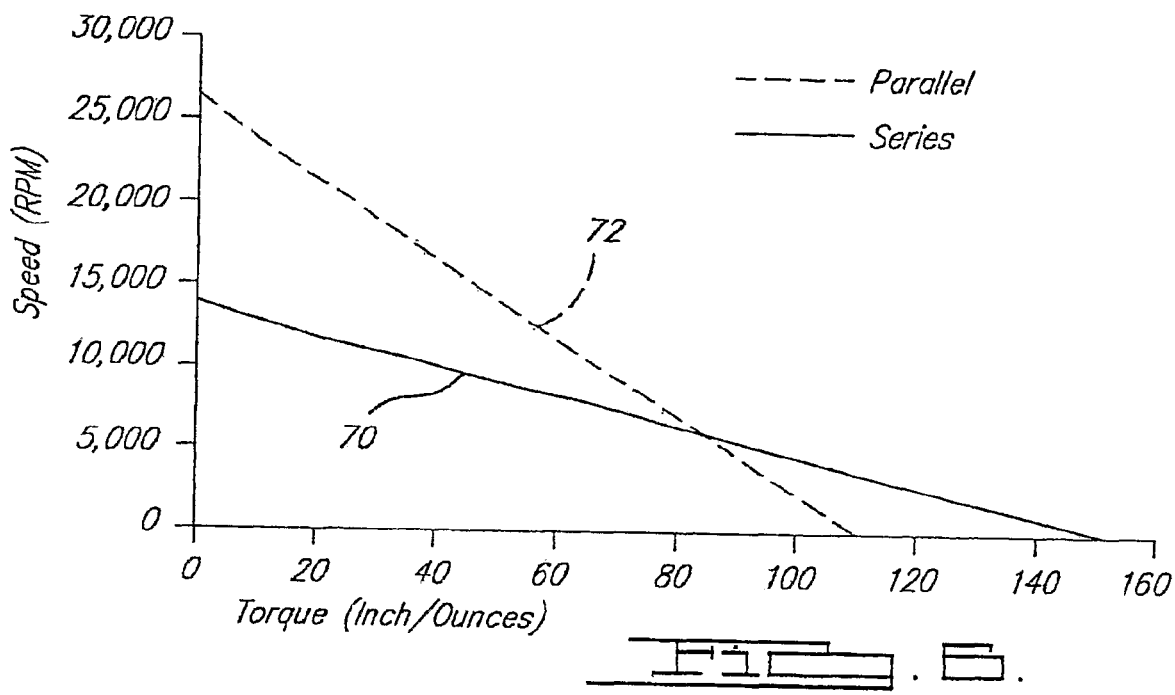
FIG. 6 illustrates two performance curves, one illustrating the speed/torque relationship for the motor when the motor has its armature coils connected in series, and the other illustrating the speed/torque relationship when its armature coils are connected in parallel.

Referring now to FIGS. 6-10, comparisons of the operating characteristics of the motor 10*a* when it is operating in its two operating modes are shown. In FIG. 6, the speed/torque relationship is shown by curves 70 and 72, with curve 70 representing the two coil sets 44,58 in series connection (operating mode 1), and curve 72 representing the two coil sets in parallel connection (operating mode 2). Curve 72 indicates the no-load speed is significantly higher (about 27,000 rpm in this example) when the motor 10*a* is configured with its armature coils sets 44,58 in a parallel connection.

Figure 7:
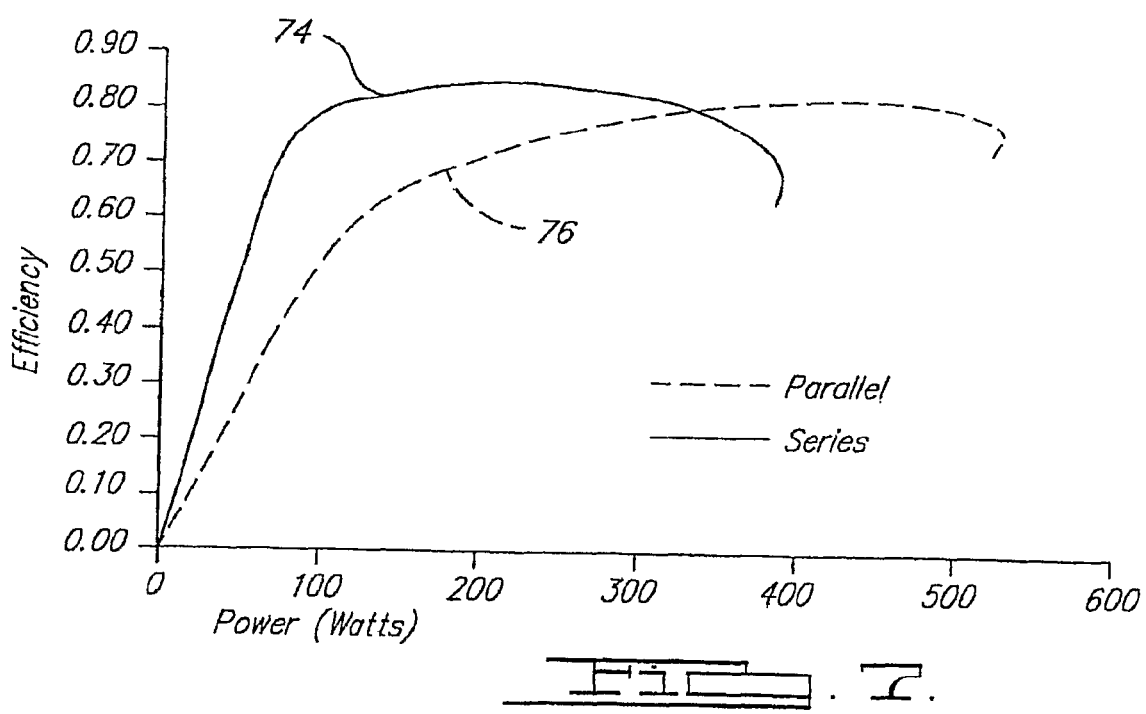
FIG. 7 illustrates two performance curves, one illustrating the efficiency/power relationship for the motor when the motor has its armature coils connected in series, and the other illustrating the efficiency/power relationship when its armature coils are connected in parallel.

FIG. 7 illustrates the relationship between efficiency and power when the motor armature coil sets 44,58 are connected in series and parallel configurations. Curve 74 indicates the series connection and curve 76 indicates the parallel connection. Motor efficiency can be seen to be higher with the series connection when the motor 10*a* output power is less than about 300 watts, and still significantly higher at motor power outputs of less than about 100 watts. Thus, for light duty work tasks, the series connection of the coil sets 44,58 (operating mode 1) enables the motor 10*a* to operate in a highly efficient manner that can extend the run time of the drill 12 on a given charge beyond what would be possible if the motor 10*a* was configured to provide a constant, maximum power output.

Figure 8:
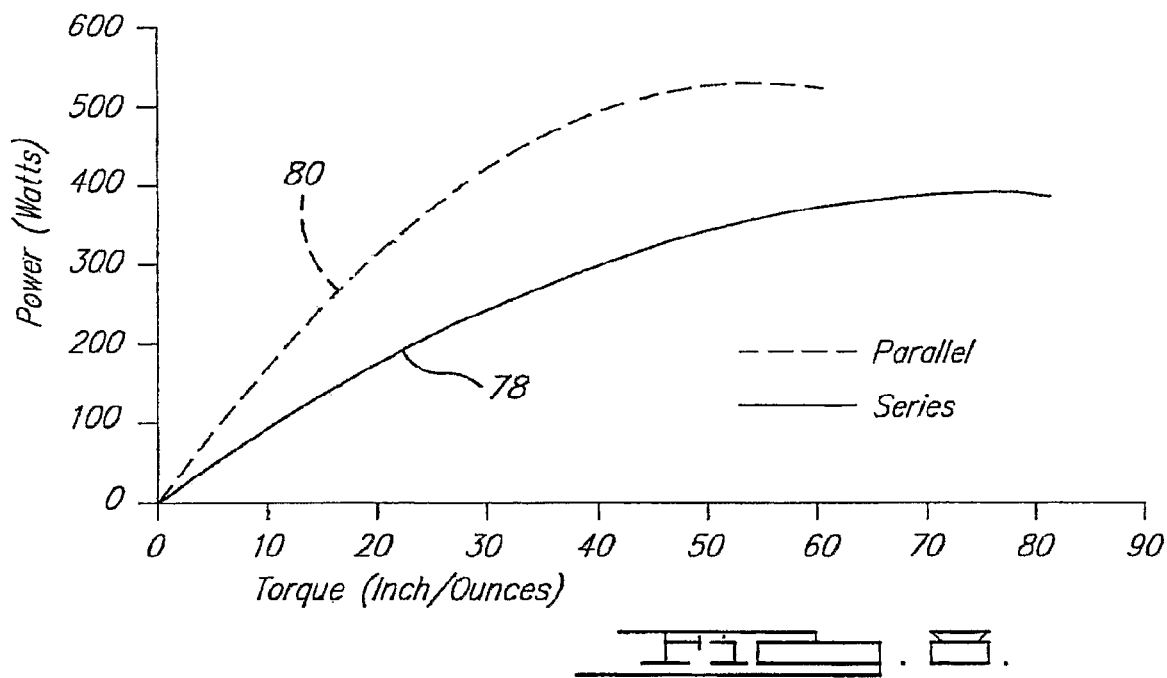
FIG. 8 illustrates two performance curves, one illustrating the power/torque relationship for the motor when the motor has its armature coils connected in series, and the other illustrating the power/torque relationship when its armature coils are connected in parallel.

FIG. 8 illustrates the relationship between motor power and motor torque when the motor 10*a* is connected in each of its two operating modes. Curve 78 indicates the power/torque relationship when the motor 10*a* has its two coil sets 44,58 connected in series. Curve 80 represents the power/torque relationship when the two coil sets 44,58 are connected in parallel. For a given motor torque, the parallel connection of the coil sets 44,58, shown by curve 80, can be seen to use more motor power than what the motor 10*a* would draw with the coil sets 44,58 coupled in their series configuration. For example, at 40 inch/ounces of torque the motor 10*a*, with its coil sets 44,58 coupled in parallel, the motor 10*a* uses almost 200 watts of additional power beyond that consumed by the motor 10*a* when its coil sets 44,58 are connected in series.

Figure 9:
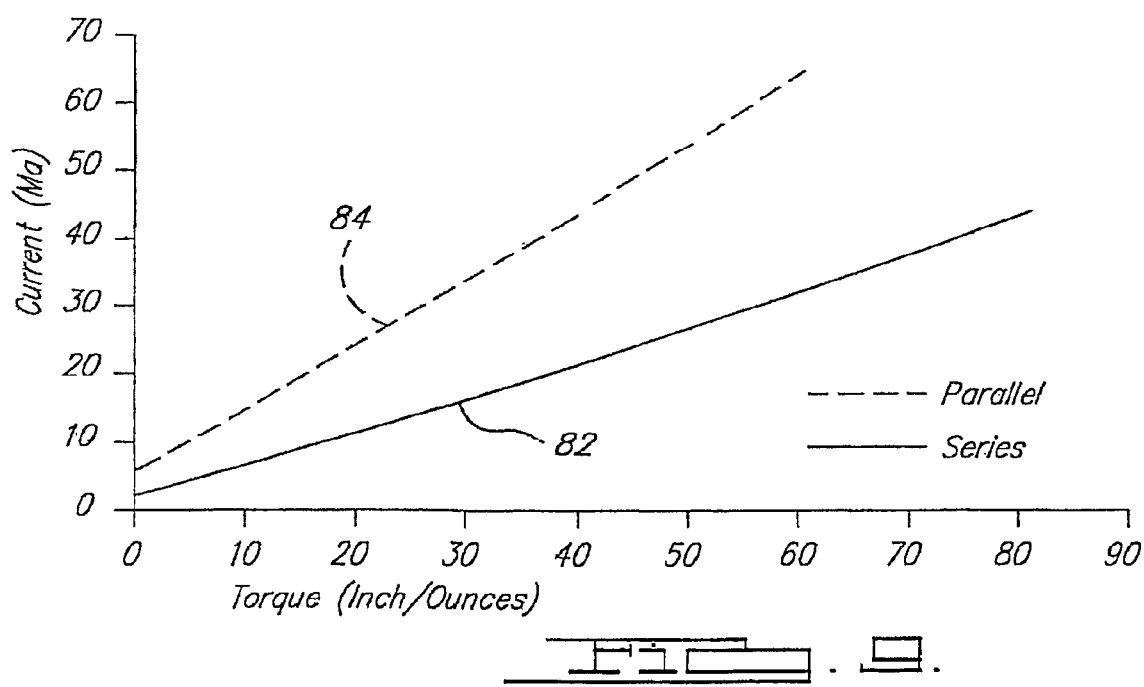
FIG. 9 illustrates two performance curves, one illustrating the relationship between current/torque relationship for the motor when the motor has its armature coils connected in series, and the other illustrating the current/torque relationship when its armature coils are connected in parallel.
Figure 10:
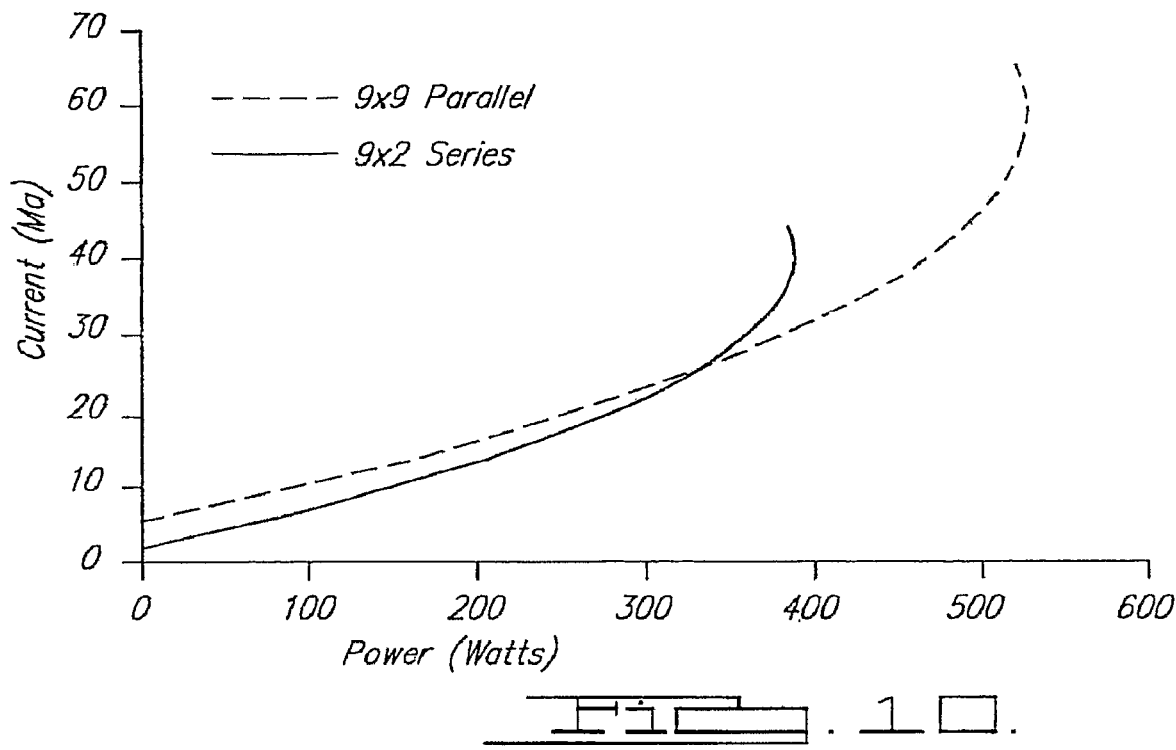
FIG. 10 is a graph illustrating the relationship between current and power drawn by the motor for each of the series and parallel connected coil sets.

FIG. 9 illustrates the relationship between motor current and motor torque for both series and parallel connected coil sets 44,58. Performance curve 82 represents the current/torque relationship of the motor 10*a* when its coil sets 44,58 are connected in series. Curve 84 represents the coil sets 44,58 connected in parallel. When the coil sets 44,58 are connected in parallel, the motor 10*a* draws considerably more current when producing a given torque. For example, at 50 inch/ounces of motor torque, the motor 10*a* is drawing almost 30 milliamps more current with its coil sets 44,58 connected in parallel than what would be drawn with the coil sets connected in series. Thus, for light duty applications requiring low motor torque (and thus lower motor output power), using the series connection for the coil sets 44,58 allows the motor 10*a* to draw significantly less current when providing a given torque. FIG. 10 illustrates the relationship between the current and power drawn by the motor 10*a* for each of the series and parallel connection schemes.

Figure 11:
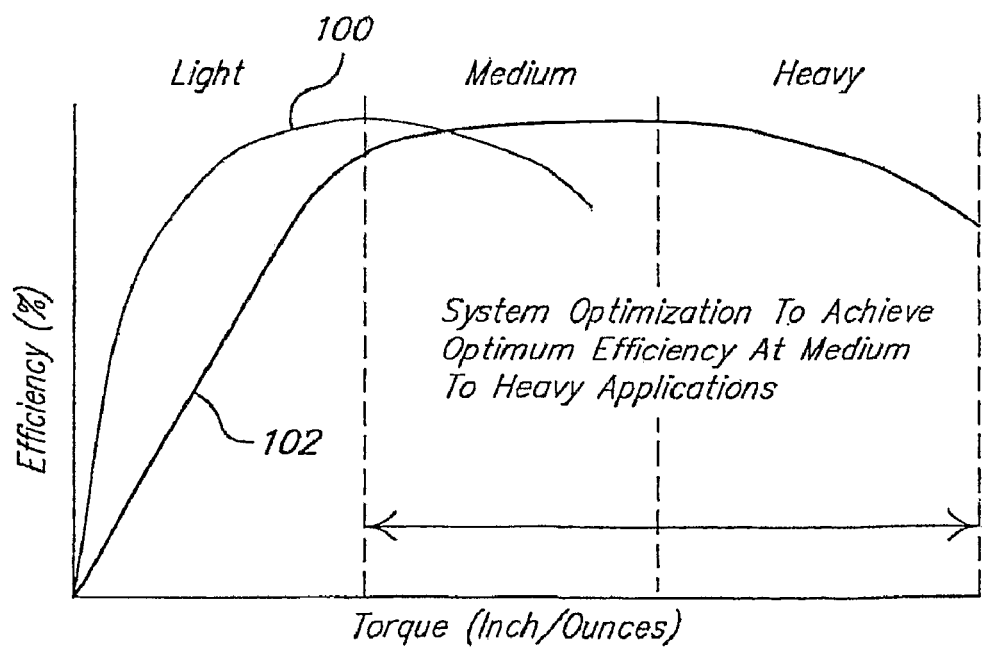
FIG. 11 is a graph illustrating the relationship of motor efficiency to the available torque output of the motor in "Light", "Medium" and "Heavy" drilling applications.
Figure 12:
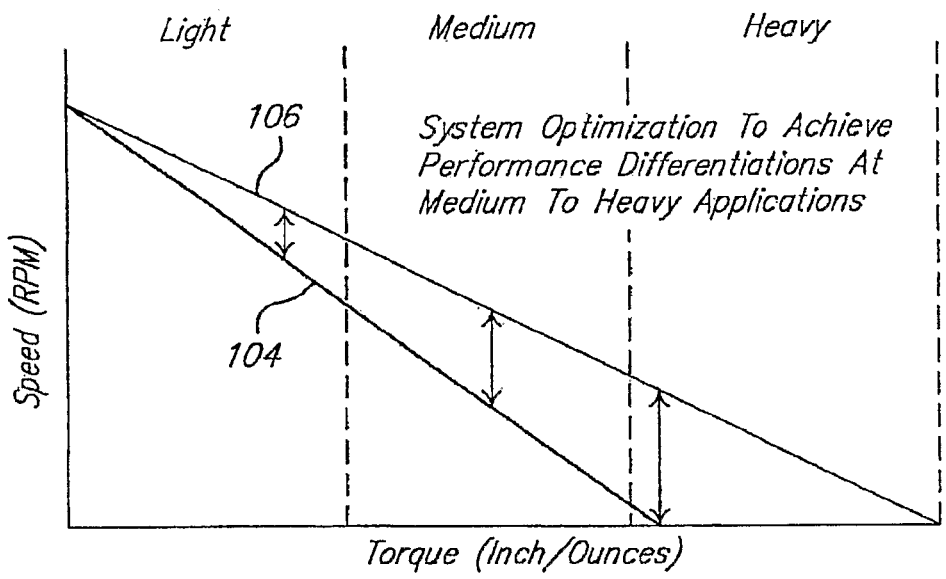
FIG. 12 is a graph illustrating the relationship of motor speed to torque in each of "Light", "Medium" and "Heavy" drilling applications.

Referring to FIGS. 11 and 12, graphs are presented illustrating the different efficiencies and torques produced in different operating modes of the motor 10*a*. In FIG. 11, operating the motor 10*a* in a maximum efficiency mode, for example mode "1", produces an efficiency/torque curve represented by curve 100. Operating the motor 10*a* in a maximum "power" mode produces an efficiency/torque curve represented by curve 102. FIG. 12 illustrates that the speed of the motor 10*a* can be controlled to tailor it to either light, medium or heavy duty applications requiring differing degrees of torque output. Curve 104 and curve 106 illustrate the use of a higher motor speed (i.e., curve 106) to achieve maximum torque for heavy duty applications.

Figure 13:
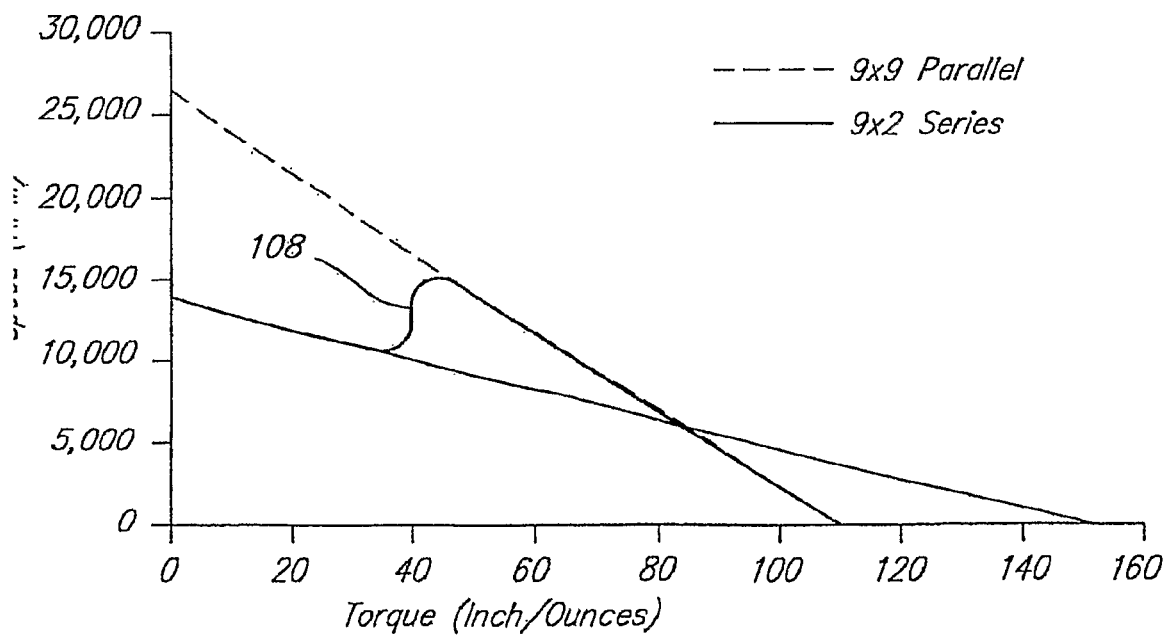
FIG. 13 is a graph illustrating that the connection of the coil sets can be changed virtually instantaneously to alter the performance characteristics of the motor.

FIG. 13 illustrates how the coil sets 44,58 can be switched when operating the tool 12 to virtually instantly change the operational characteristics of the tool. The changeover from series to parallel connections (or vice versa) could be a "hard" changeover, in which the electrical connections are changed without any electrical "smoothing" of the transition. Such a changeover is illustrated by curve 108 in FIG. 13. Once the motor 10*a* speed drops to about 11,000 rpm, the series connected coil sets 44,58 are coupled in parallel, thus providing greater power output from the motor 10*a*. The advantage this provides is that the tool incorporating the motor 10*a* will have increased run time, for a given motor and battery charge, during light load work tasks as compared to what could be achieved with parallel connected coils. However, connecting the coil sets 44,58 in parallel enables the maximum power output of the motor 10*a* to be increased beyond what would be possible with the coil sets 44,58 connected in series. This makes more power available from the same motor 10*a* when performing heavy load work tasks.

Figure 14:
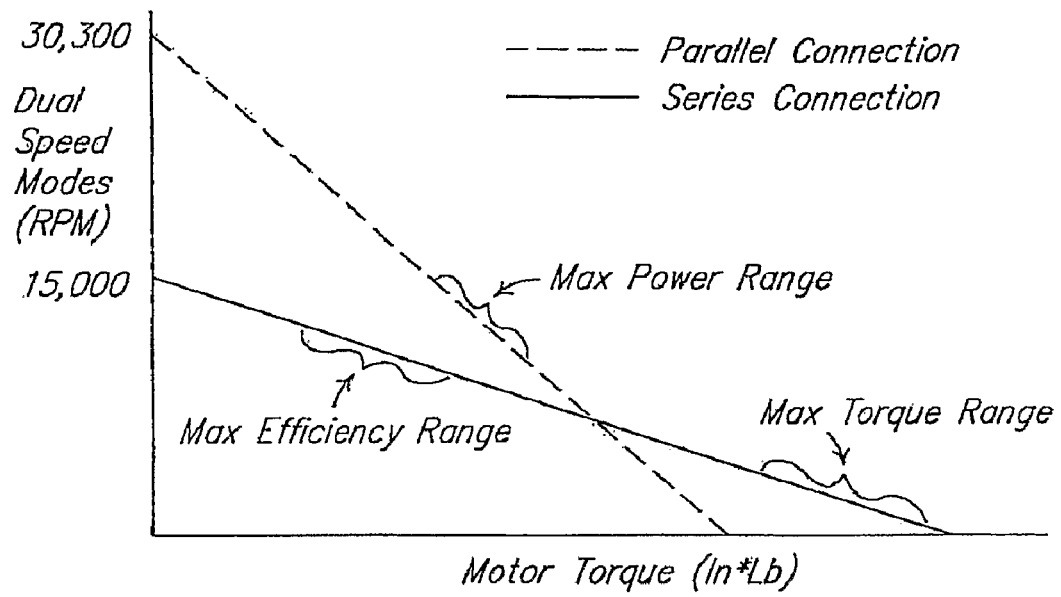
FIG. 14 is a graph illustrating a pair of speed/torque performance curves representing series and parallel coil connections, and further illustrating the maximum power range, maximum torque range and maximum efficiency range of the motor using the parallel and series connections of the coils.

For the drill 12, switching the coil sets 44,58 between series and parallel configurations enables the output characteristics of the motor 10*a* to be changed in real time. Referring to FIG. 14, the series connection provides a maximum efficiency range and a maximum torque range. The parallel connection, however, provides a maximum operating speed and a maximum power range.

Figure 15:
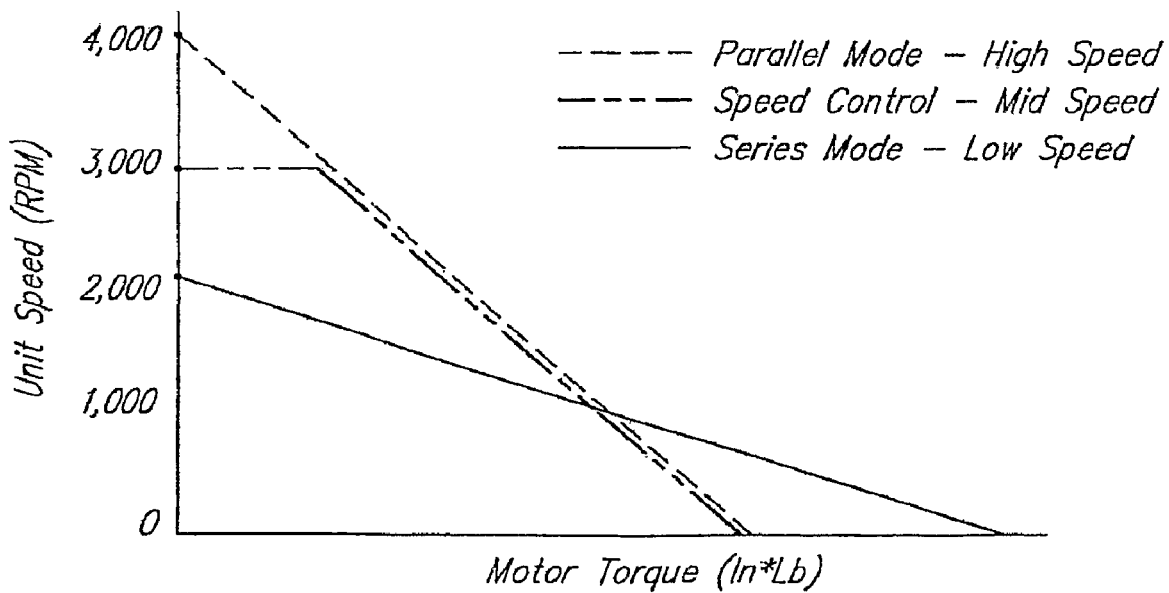
FIG. 15 is a graph illustrating three motor performance curves to show how the use of speed control can be implemented to produce a speed/torque performance curve that is a modification of the curves produced by the parallel and series connected coils.

FIG. 15 illustrates how the motor 10*a* output characteristics can be changed by a combination of series/parallel switching and using the gear reduction unit 16 to further tailor the output speed. In a power saw application, this would be especially useful for tailoring the speed of the saw blade to optimize performance of the saw when cutting different types of materials (e.g., soft woods versus hardwoods) and/or when using different types of saw blades.

Figure 16:
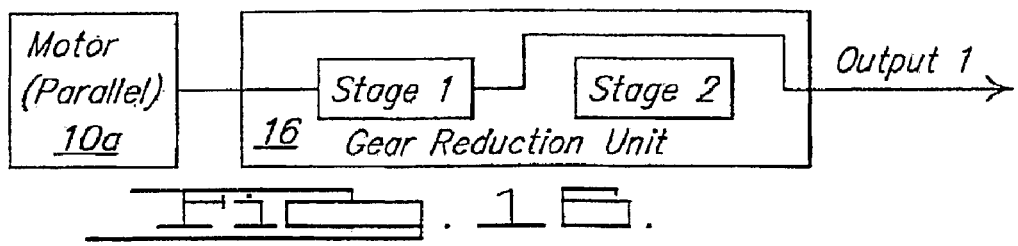
FIGS. 16-21 illustrate simplified schematic representations of the motor and gear reduction unit and how a plurality of different outputs can be obtained using the series or parallel coil connections with different internal stages of the gear reduction unit.
Figure 17:
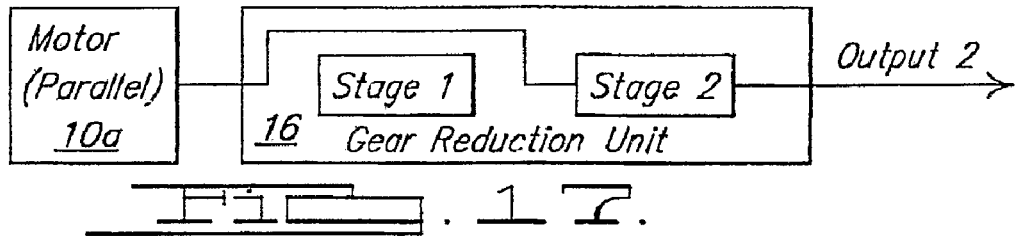
Figure 18:
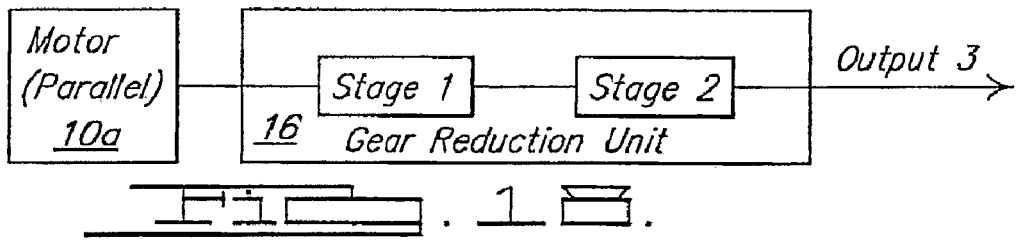
Figure 19:
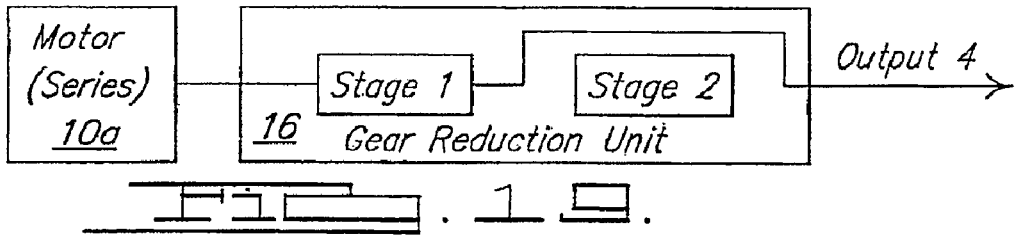
Figure 20:
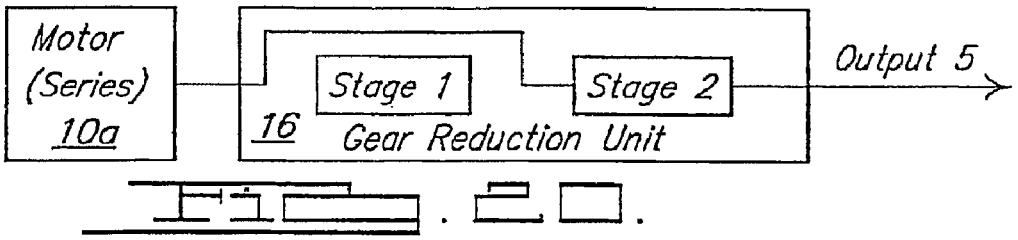
Figure 21:
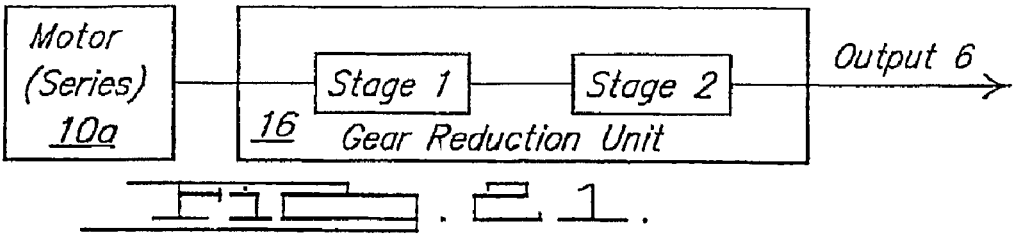

Obtaining Increased Number of Motor Performance Output Curves By Control of Motor and Gear Reduction Unit The motor 10*a* and the gear reduction unit 16 can be controlled by the controller 28 to provide a number of unit 16 output speeds that exceeds the number of difference speeds that can be implemented by only controlling the gear reduction unit 16. For example, with reference to FIGS. 16-21, a plurality of simplified diagrams are shown illustrating one embodiment of the gear reduction unit 16, which in this example comprises a two stage gear reduction unit. Through just selection of various ones of the stages of a two stage gear reduction unit, three different output speeds could be obtained from the motor/gear reduction unit combination, as shown in FIGS. 16-18. However, the ability to connect the coil sets 44,58 of the motor 10*a* in either series or parallel enables a total of six different output speeds to be obtained from the two stage gear reduction unit 16. This enables a less costly, smaller and lighter weight gear reduction unit to be employed to provide a given number of different output curves, than what would otherwise be required without the series/parallel connection capability. The use of a smaller, lighter gear reduction unit in a hand-held power tool is especially advantageous, where weight and the dimensions of the tool are important design considerations.

The ability to combine the connection configuration of the motor coil sets 44,58 (in series or parallel), and the electronic control of the gear reduction unit 16 makes it possible to obtain a wide range of outputs having various performance characteristics. For example, connecting the coil sets 44,58 in series will provide a higher efficiency at a given low power output than what could be achieved with the coil sets connected in parallel, for the same motor. Thus, the series configuration for the motor coil sets 44,58 could be used with a high speed gear ratio of the gear reduction unit 16 to optimize the drill 12 for use with driving small screws or drilling with small diameter drill bits, where a high motor speed is desirable. Conversely, the parallel connection of the coil sets 44,58 (which provides a greater maximum power output) could be used in connection with a lower speed gear ratio. This combination would provide maximum application speed and thermal stability for heavy duty work tasks. Thus, it will be appreciated that a wide range of various motor outputs having various speed/torque/power/efficiency characteristics can be achieved through selective connection of the coil sets 44,58 and control of the gear reduction unit 16.

Figure 22:
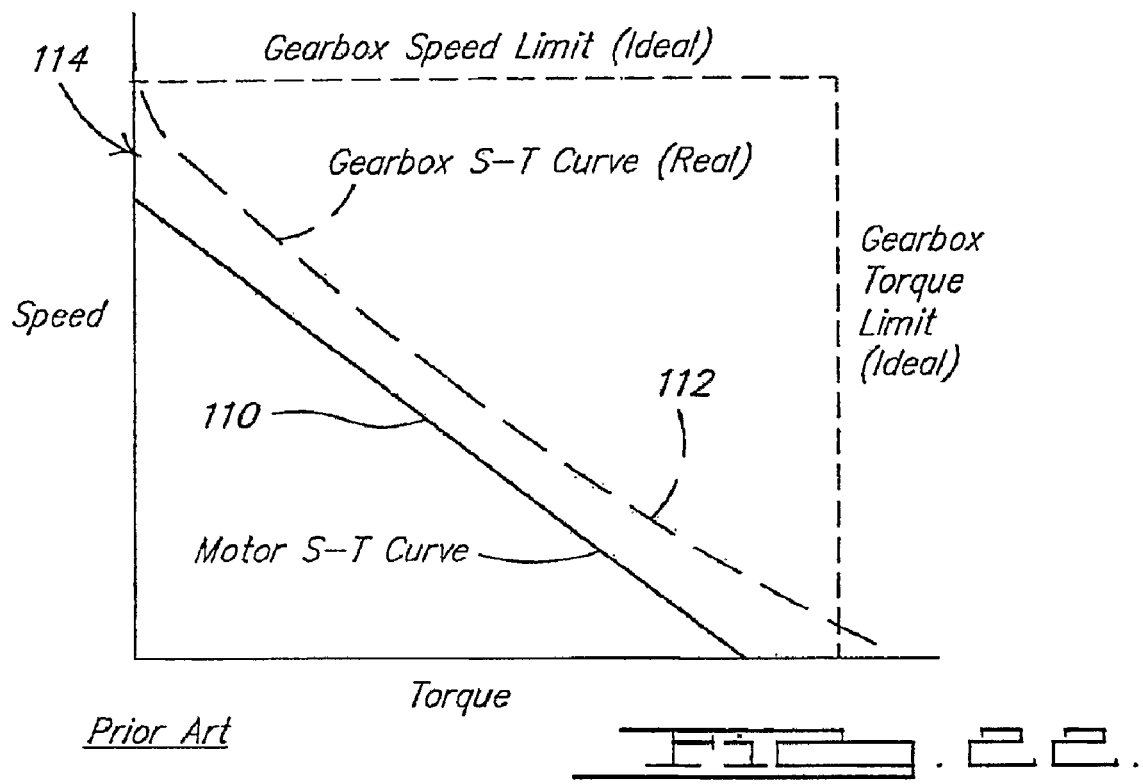
FIG. 22 is a graph of a conventional speed-torque curve of an electric motor and a speed-torque performance curve of a typical gear box, illustrating the typical speed-torque "headroom" that needs to be designed into the gear box.

Using Controller To Match Motor Speed-Torque Curve to Gear Reduction Unit Speed-Torque Capability The controller 28 can also be used to match the motor 10*a* speed-torque performance curve to the gear reduction unit 16 speed-torque performance curve. This eliminates the need to design in a sufficient amount of speed-torque "headroom" into the gear reduction unit 16 to ensure that the motor 10*a* will not damage or unduly stress the gear reduction unit 16 during operation of the drill 12. With brief reference to FIGS. 22-24, this feature can be further explained. FIG. 22 illustrates an exemplary degree of typical "headroom" that needs to be designed into a gear reduction system (often termed simply a "gear box") to ensure that the motor with which it is used will not damage or unduly stress the gear system. Curve 110 represents an exemplary speed-torque performance curve of a DC motor, and curve 112 represents an exemplary speed-torque performance curve of a conventional gear box. The speed-torque "headroom" designed into the gear box is represented by the area 114 between the two curves 110 and 112. Area 114 is essentially the added degree of speed-torque handling capability designed into the gear box beyond what the motor is capable of developing. This headroom ensures that the motor cannot over stress or damage the gear box.

Figure 23:
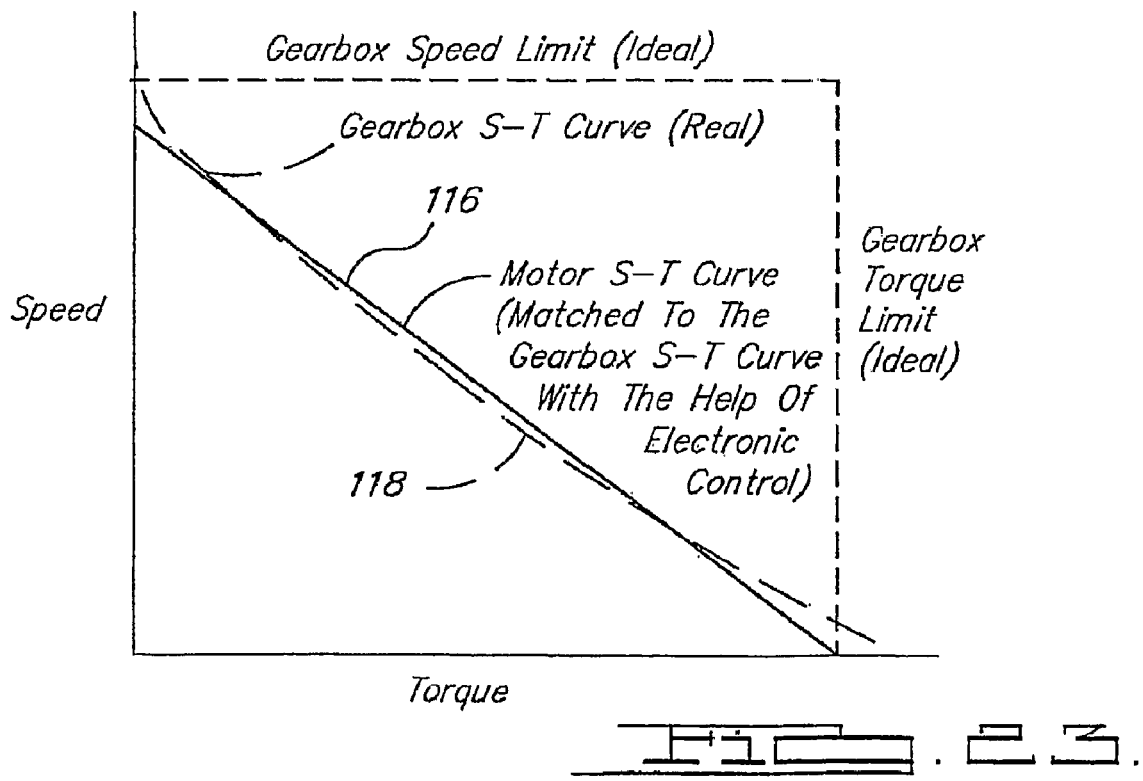
FIG. 23 is a graph illustrating how the speed-torque performance of the new motor described herein is controlled by the controller of the motor system to essentially match, but not exceed, the speed-torque capability of the gear reduction unit.

FIG. 23 illustrates controlling the motor 10*a* speed-torque characteristics to essentially "push" the motor speed-torque performance curve up to match the maximum speed-torque performance capability of the gear reduction unit 16. In this example, curve 116 represents the motor 10*a* speed-torque performance curve that the controller 28 implements for the motor 10*a*. Curve 118 represents the speed-torque performance curve designed into the gear reduction unit 16. The controller 28 controls the motor 10*a* to "push" or increase the speed-torque curve for the motor 10*a* up to essentially match the speed-torque curve of the gear reduction unit 16. This allows most efficient use of the speed-torque capability of the gear reduction unit 16 by eliminating the headroom area 114 that would normally be designed into the gear reduction unit 16. By monitoring important motor operating characteristics such as motor speed and motor current, the controller 28 ensures that the motor 10*a* operation does not at any time exceed the speed-torque performance capability of the gear reduction unit 16. Conversely, by using the controller 28 to monitor and closely control the motor 10*a* speed-torque performance capability, a less expensive gear reduction unit could be implemented for a given motor.

Figure 24:
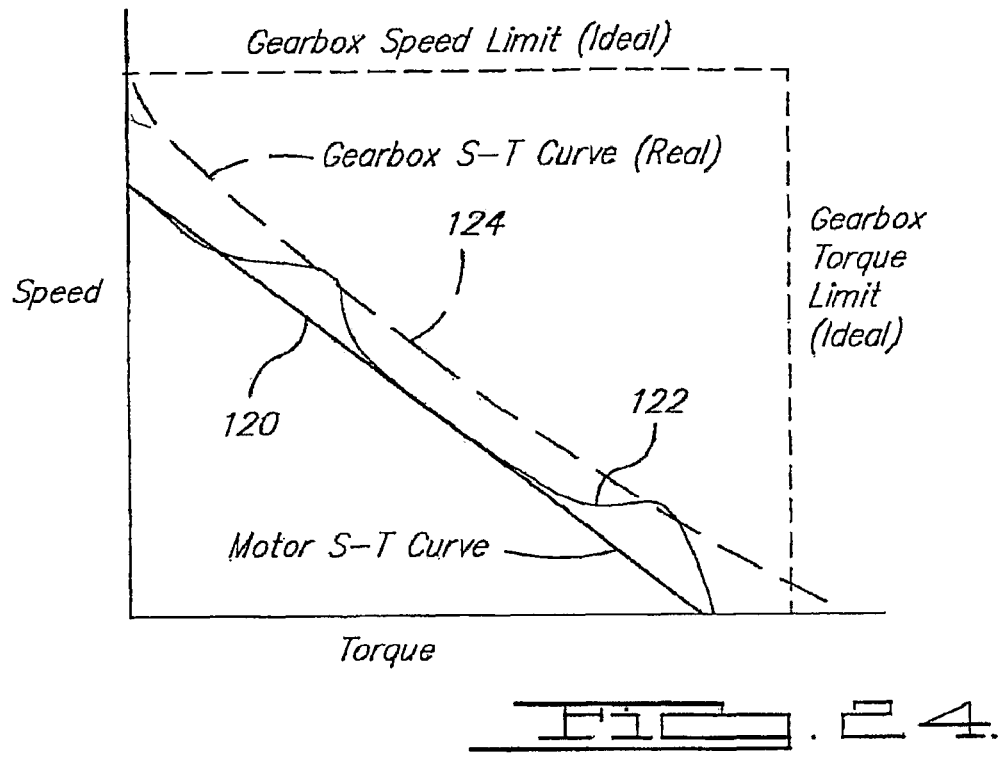
FIG. 24 is a graph illustrating how the speed-torque performance of the new motor can be controlled by the controller of the motor system to match, and periodically exceed, for short durations, the speed-torque performance capability of the gear reduction unit.
Figure 23:
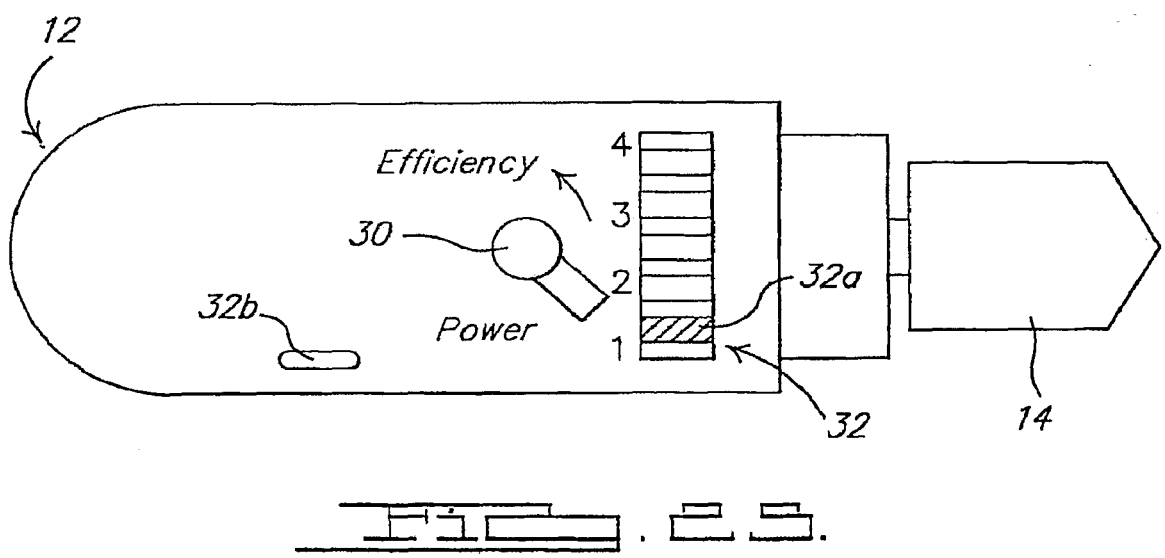
Figure 26:
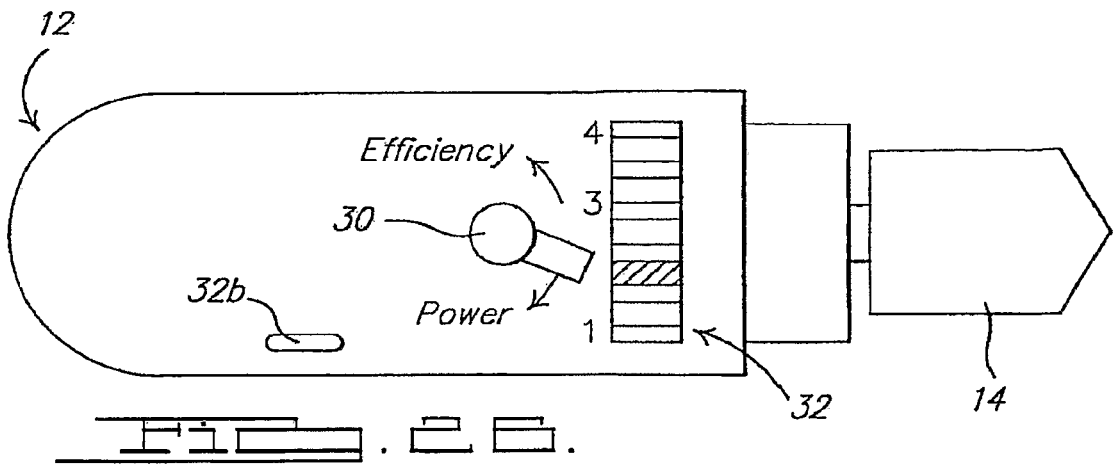
Figure 27:
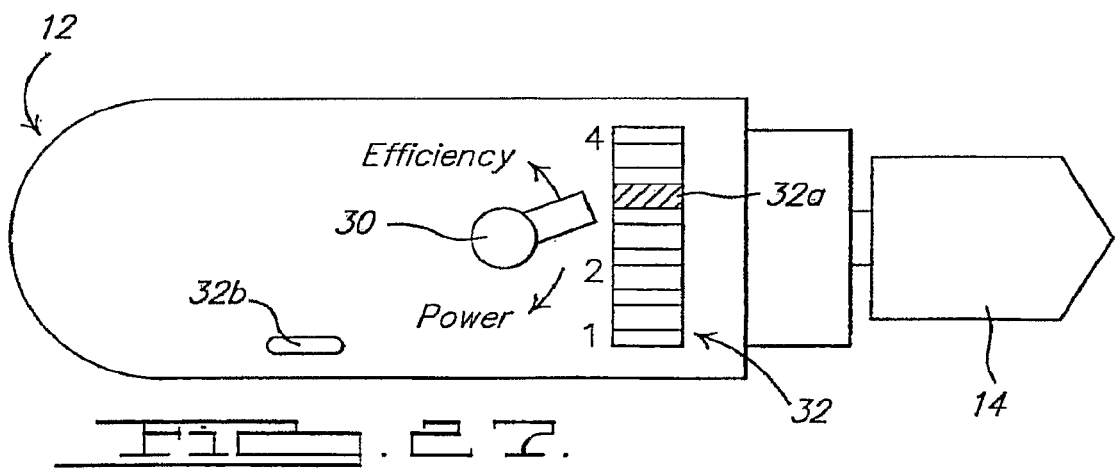
Figure 28:
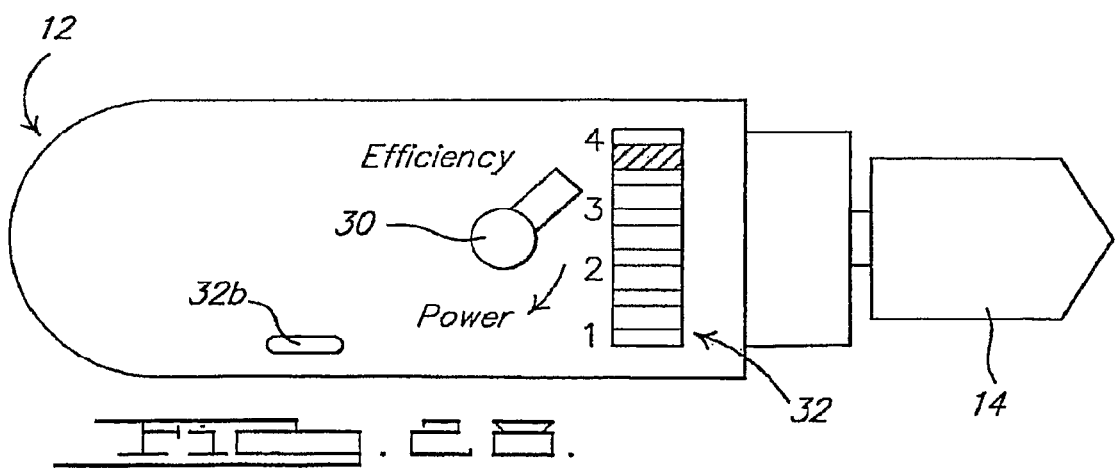

Referring to FIG. 24, an alternative control methodology can also be employed in which the controller 28 controls the motor 10*a* speed-torque performance so that it is only periodically increased, for short durations, to that of the gear reduction unit 16. Curve 120 represents a constant motor 10*a* speed-torque curve implemented by the controller 28. Curve 122 illustrates the operating points of the speed-torque curve 120 being increased by the controller 28 to periodically "push up" to the speed-torque curve 124 of the gear reduction unit 16 for short durations. In this way, the motor 10*a* can be controlled by the controller 28 to match, or even slightly exceed, the speed-torque performance capability of the gear reduction unit 16 for short durations that do not unduly stress or give rise to a risk damaging the gear reduction unit. This will also allow a less expensive gear reduction unit to be used, since the gear reduction unit will not need to be designed with sufficient headroom to be able to continuously accommodate the full speed-torque capability of the motor 10*a*.

Operation of User Selector Control

Referring now to FIGS. 25-28, the description of the user selector 30 will be further described. The selector 30, in one preferred form, comprises a multi-position switch that can be manually positioned by the user between one of a plurality of positions to select one of a plurality of different modes. In the present example, four operating modes are shown. Mode "1" (FIG. 25) provides a maximum power mode, while mode "4" (FIG. 28) provides a maximum efficiency operation mode. In mode "4", for example, the power output from the motor 10*a*, in the fourth switch position, may be limited by the controller 28 to a maximum of, for example, 300 watts output. In the "1" position, the maximum power output of, for example, 600 watts is selected. The controller 28 also varies the motor 10*a* speed between a plurality of predetermined speeds, in accordance with the selector 30 position, to best suit the task at hand (i.e., either providing maximum power, maximum efficiency or some combination therebetween). As an example, switch position "1" may comprise a chuck 14 speed of 450 rpm, position "2" (FIG. 26) may comprise a speed of 850 rpm, position "3" (FIG. 27) a speed of 1400 rpm and position "4" a speed of 2,000 rpm. Alternatively, the selector 30 may be coupled to the gear reduction unit 16 such that the selector is moved automatically from one mode to another mode as the controller 28 senses the load on the motor 10*a*. For example, the controller 28 may be used to switch from a maximum efficiency mode (i.e., mode 4) to an intermediate mode (i.e., mode 2) momentarily if an additional degree of motor loading is sensed. The additional degree of loading is sensed by an increase in the current draw by the motor 10*a*. If the period of increased load abates, then the controller 28 may again switch the operational mode back to the mode selected by the user. The controller 28 maybe implemented in a closed loop scheme or an open loop scheme to connect the coils in series or parallel configurations, depending on one or more sensed operating parameters such as speed or torque.

Display 32 may comprise a first plurality of LEDs 32*a* for indicating to the user that the controller 28 has overridden the operating mode selected by the user, and provide an indication as to which operating mode the motor 10*a* is presently operating in. LED bank 32*b* may be used to indicate a level of charge of the battery 22 of the drill 12.

Using Controller To Further Tailor Motor Operating Characteristics

In either of the operating modes described above, the controller 28 may implement commutation advance and voltage control to provide still further tailoring of the efficiency/torque and speed/torque curves described above. Additionally, the maximum current (i.e., stall current) of the motor 10a can be controlled by the controller 28. For example, the controller 28, as it senses the current being drawn by the motor 10a, can ramp down the torque output of the motor 10a after a predetermined time limit of maximum current draw has been exceeded. For example, if the stall current lasts for longer than two seconds, the controller 28 can ramp down the torque output of the motor 10a to a predetermined lower level to prevent excessive current draw on the battery 22.

The controller 28 can also be programmed to gradually reduce the applied voltage to the motor 10a to simulate power loss once the motor is pushed past a safe operating range while in a maximum power operating mode. A maximum current limit can be used if the drill 12 is being used in its efficiency mode (i.e., low power mode).

The controller 28 could also be used to automatically switch the motor 10a from its light duty power output mode to its high power output mode when the drill 12 is stalled in a particular gear, to produce a higher power output from the motor 10a. The time duration during which the drill 12 can be continuously operated in its high power mode may be monitored and limited to prevent excessive heating of the motor 10a.

The controller 28 can also be used to implement one or more braking modes to reduce the stress on various internal components of the drill 12. For example, regenerative braking could be achieved by generating current from the motor 10a inertia and directing it back into the battery 22.

The controller 28 can also be used to implement a torque control feature for anti-lock, and thus to implement a form of "electronic" clutch. For example, sensing the instantaneous rate of change of the current being drawn by the motor 10a can be used to control the torque output of the motor. This can provide anti-kickback or anti-lock features to the drill 12. The maximum current that can be drawn by the motor 10a in either of its operating modes can be limited, such as by software, if desired. The controller 28 can also be used to implement reversing capability for the motor 10a. Preferably, the light duty power mode is the "default" mode when the tool 12 is switched to reverse. A different current limit value could be set for the motor 10a when the motor is being operated in reverse. For example, if a relatively high current limit is set when the drill 12 is being operated in the reverse mode, this would enable higher torque to be generated by the motor 10a, and thus enable faster removal of threaded screws from a workpiece.

Still further, the controller 28 could be configured using either a closed loop or open loop approach. If a closed loop approach is used, the controller 28 would use feedback from the current sensing system 40 and the motor speed sensor 38 to modify the operating characteristics of the motor 10a. If an open loop approach is used, the controller 28 may use one or more look-up tables stored in an internal or external memory with stored information (i.e., various motor speeds and/or current draws of the motor 10a) to select the optimum operating mode during a given work task. Moreover, the controller 28 could be integrated in a single assembly (i.e., "package") with the motor 10a, or located remotely from the motor 10a as illustrated in FIG. 1. The controller 28 could also be located on a common printed circuit assembly with the switching connection subsystem 36 (FIG. 1) or located remotely from the subsystem 36.

The motor 10a, the controller 28, and the connection subsystem 36 can thus be employed to achieve a plurality of different operating modes from a single motor. Modes involving either a light duty operating mode or a maximum power operating mode can be implemented by user selection or automatically by the controller 28. The motor system 10 enables the run time of a battery to be extended when the tool is being used in applications where a lesser amount of motor power is needed, and easily switched, either manually or automatically, to provide more motor power if the work task requires such. Operating a battery powered tool having the motor system 10a will enable a longer run time to be achieved, for a given battery charge, over what would be achievable if the motor was operated in its maximum power mode. Maximum power would still be readily available if a work task requires such, either automatically or by the user simply moving a control, such as a switch, to manually select the desired operating mode.

The description of the various embodiments is merely exemplary in nature and, thus, variations that do not depart from the gist of the disclosure are intended to be within the scope of the present disclosure.

What is claimed is:

1. A power tool comprising:
   a motor;
   the motor having an armature including:
      a first set of armature coils wound on a lamination stack;
      a second set of armature coils wound on said lamination stack; and
      a switching system that connects the two sets of armature coils in either series or parallel configurations.

2. The power tool of claim 1, wherein the switching system further comprises:
   a first set of commutator bars selectively electrically coupled to said first set of armature coils; and
   a second set of commutator bars selectively electrically coupled to said second set of armature coils.

3. The power tool of claim 2, wherein the switching system further comprises a first set of brushes for interfacing with said first set of commutator bars, and a second set of brushes for interfacing with said second set of commutator bars.

4. The power tool of claim 3, wherein the switching system further comprises:
   a plurality of switches interconnected between selected ones of said brushes; and
   a controller for controlling operation of the switches as needed to switch the coils between series and parallel configurations.

5. A power tool comprising:
   an electric motor;
   the motor having an armature including:
      a first set of armature coils wound on a lamination stack;
      a second set of armature coils wound on said lamination stack; and
      a switching system that connects the two sets of armature coils in a first configuration to provide maximum power output, and a second configuration to provide a maximum motor efficiency.

6. The power tool of claim 5, wherein said first configuration comprises connecting said sets of armature coils in parallel.

7. The power tool of claim 5, wherein said second configuration comprises connecting said sets of armature coils in series.

8. The power tool of claim 5, wherein said switching system comprises first and second pluralities of commutator bars coupled to selected ones of said armature coils.

9. The power tool of claim 8, wherein said switching system further comprises first and second pairs of brushes for interfacing a power source to said pluralities of commutator bars.

10. The power tool of claim 9, wherein said switching system comprises a plurality of switches that are controlled by a controller to automatically switch said armature coils between said first and second configurations.

11. The power tool of claim 9, wherein said switching system comprises a plurality of switches that are manually controlled to switch said armature coils between said first and second configurations.

12. The power tool of claim 8, wherein said first pair of brushes is positioned to contact said first plurality of commutator bars, and said second pair of brushes is positioned to contact said second plurality of commutator bars.

13. The power tool of claim 9, wherein said armature coils form an armature assembly having an armature shaft, and wherein said first pair of brushes is disposed at a first end of said armature shaft and said second pair of brushes is disposed at a second end of said armature shaft.

14. The power tool of claim 1, further comprising:
an output shaft for the motor; and
a gear reduction unit in communication with the output shaft that modifies an output speed of the motor.

15. The power tool of claim 14, wherein the gear reduction unit comprises a multi-stage gear reduction unit, and the switching system includes a controller for controlling the multi-stage gear reduction unit in addition to selectively connecting the two sets of armature coils.

16. The power tool of claim 5, further comprising:
an output shaft associated with the motor; and
a gear reduction unit in communication the output shaft that modifies an output speed of the motor.

17. A power tool comprising:
an electric motor;
the motor having:
an output shaft;
an armature mounted on the output shaft,
a lamination stack;
a first set of armature coils wound on the lamination stack;
a second set of armature coils wound on said lamination stack; and
a plurality of switches for selectively electrically connecting the first and second sets of armature coils;
a controller that controls the switches to connect the two sets of armature coils in a first configuration to provide maximum power output, and a second configuration to provide maximum motor efficiency.

18. The power tool of claim 17, further comprising a gear reduction unit in communication with the output shaft of the motor, for modifying an output speed of the motor.

19. The power tool of claim 18, wherein the gear reduction unit comprises a multistage gear reduction unit.

20. The power tool of claim 19, wherein the gear reduction unit is controlled by the controller.

* * * * *